(12) United States Patent
Wang

(10) Patent No.: US 9,788,187 B2
(45) Date of Patent: Oct. 10, 2017

(54) MULTIPLE LINK COMMUNICATION

(71) Applicant: MEDIATEK INC., Hsinchu (TW)

(72) Inventor: Chao-Chun Wang, Taipei (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 14/826,851

(22) Filed: Aug. 14, 2015

(65) Prior Publication Data

US 2016/0049996 A1  Feb. 18, 2016

Related U.S. Application Data

(60) Provisional application No. 62/037,240, filed on Aug. 14, 2014.

(51) Int. Cl.
| | |
|---|---|
| *H04K 1/10* | (2006.01) |
| *H04L 27/28* | (2006.01) |
| *H04W 8/00* | (2009.01) |
| *H04W 72/02* | (2009.01) |
| *H04W 76/02* | (2009.01) |
| *H04W 88/06* | (2009.01) |

(52) U.S. Cl.
CPC .......... *H04W 8/005* (2013.01); *H04W 72/02* (2013.01); *H04W 76/023* (2013.01); *H04W 88/06* (2013.01)

(58) Field of Classification Search
CPC ....... H04L 25/14; H04L 25/4925; H04L 5/20; H04L 25/0272; H04L 25/49
USPC ................. 375/224–228, 259–294
See application file for complete search history.

(56) References Cited

U.S. PATENT DOCUMENTS

| | | | | |
|---|---|---|---|---|
| 2002/0116715 A1* | 8/2002 | Apostolopoulos | ...... | H04L 29/06 725/86 |
| 2005/0204057 A1* | 9/2005 | Anderson | ......... | H04L 29/06027 709/236 |
| 2005/0243835 A1* | 11/2005 | Sharma | ............... | H04L 12/2874 370/395.42 |

(Continued)

FOREIGN PATENT DOCUMENTS

| | | |
|---|---|---|
| CN | 102904934 A | 9/2012 |
| WO | WO2006041339 A1 | 10/2004 |

OTHER PUBLICATIONS

International Search Report and Written Opinion of International Search Authority for PCT/CN2015/087057 dated Nov. 17, 2015 (11 pages).

*Primary Examiner* — James M Perez
(74) *Attorney, Agent, or Firm* — Imperium Patent Works; Mark Marrello

(57) ABSTRACT

A communication device includes a Session Management Module (SMM) that controls data that is communicated via a first communication link and the data that is communicated via a second communication link and causes the following steps to be performed: discovering a second device via a first communication link, establishing a communication session between the communication device and the second device over a first subset of the communication links (the selection of the first subset of the communication links is a function of a communication link selection rule), exchanging a first type of data over the at least one of the first subset of communication links (the at least one of the first subset of communication links is selected in accordance with a communication link data selection rule), and ending the communication session between the communication device and the second device.

16 Claims, 6 Drawing Sheets

| DATA TYPE | MINIMUM BANDWIDTH | LATENCY | PREFERENCE 1 | PREFERENCE 2 | PREFERENCE 3 |
|---|---|---|---|---|---|
| I-FRAME | 1 MBPS | 1 MS | 802.11AC | 802.11G | BLUETOOTH |
| P-FRAME | 0.5 MBPS | 5 MS | 802.11G | 802.11B | BLUETOOTH |
| B-FRAME | 0.1 MBPS | 10 MS | 802.11B | BLUETOOTH | NFC |

COMMUNICATION LINK DATA SELECTION RULE

(56) References Cited

U.S. PATENT DOCUMENTS

| | | | |
|---|---|---|---|
| 2006/0114858 A1* | 6/2006 | Walton | H04B 7/0417 370/335 |
| 2009/0172583 A1 | 7/2009 | Want et al. | 715/771 |
| 2009/0316567 A1 | 12/2009 | Larsson | 370/201 |
| 2014/0281140 A1* | 9/2014 | Mehrotra | G06F 12/0246 711/103 |
| 2014/0313989 A1* | 10/2014 | Doken | H04L 65/605 370/329 |
| 2015/0163524 A1* | 6/2015 | Hamzeh | H04W 4/18 725/116 |
| 2015/0229695 A1* | 8/2015 | Kim | H04L 65/607 709/219 |

* cited by examiner

| MINIMUM BANDWIDTH | MINIMUM SNR | MAXIMUM LATENCY | PREFERENCE 1 | PREFERENCE 2 | PREFERENCE 3 |
|---|---|---|---|---|---|
| 1 MBPS | 10 | 1 MS | 802.11AC | 802.11G | BLUETOOTH |

COMMUNICATION LINK SELECTION RULE

FIG. 6

| DATA TYPE | MINIMUM BANDWIDTH | LATENCY | PREFERENCE 1 | PREFERENCE 2 | PREFERENCE 3 |
|---|---|---|---|---|---|
| I-FRAME | 1 MBPS | 1 MS | 802.11AC | 802.11G | BLUETOOTH |
| P-FRAME | 0.5 MBPS | 5 MS | 802.11G | 802.11B | BLUETOOTH |
| B-FRAME | 0.1 MBPS | 10 MS | 802.11B | BLUETOOTH | NFC |

COMMUNICATION LINK DATA SELECTION RULE

FIG. 7

SESSION MANAGEMENT MODULE (SMM) FLOWCHART

MULTIPLE LINK COMMUNICATION

CROSS REFERENCE TO RELATED APPLICATIONS

This application claims priority under 35 U.S.C. §119 from U.S. Provisional Application No. 62/037,240, entitled, "ASP 2.0 AND SERVICE DISCOVERY FOR MULTI-BAND DEVICE" filed on Aug. 14, 2014; the subject matter of which is incorporated herein by reference.

TECHNICAL FIELD

The disclosed embodiments relate generally to communication between multiple devices, and, more particularly, to communication between multiple devices using multiple communication links available between the devices simultaneously.

BACKGROUND

The wireless communications industry has grown exponentially in recent years. Many different communication technologies have been created that provide a variety of trade-offs. Some communication technologies offer high data throughput while consuming large amounts of spectrum bandwidth and power consumption. For example, IEEE 802.11 is a set of media access control (MAC) and physical layer (PHY) specification for implementing wireless local area network (WLAN) communication in the Wi-Fi (2.4, 3.6, 5, and 60 GHz) frequency bands. The 802.11 family consists of a series of half-duplex over-the-air modulation techniques that use the same basic protocol. The standards and amendments provide the basis for wireless network products using the Wi-Fi frequency bands. For example, IEEE 802.11n is an amendment that improves upon the previous IEEE 802.11 standards by adding multiple-input multiple-output antennas (MIMO). IEEE 802.11ac is an amendment to IEEE 802.11 that builds on 802.11n. Changes compared to 802.11n include wider channels (80 or 160 MHz versus 40 MHz) in the 5 GHz band, more spatial streams (up to eight versus four), higher-order modulation (up to 256-QAM vs. 64-QAM), and the addition of Multi-user MIMO (MU-MIMO). IEEE 802.11ad is an amendment that defines a new physical layer for 802.11 networks to operate in the 60 GHz millimeter wave spectrum. This frequency band has significantly different propagation characteristics than the 2.4 GHz and 5 GHz bands where Wi-Fi networks operate. IEEE 802.11ah defines a WLAN system operating at sub 1 GHz license-exempt bands. 802.11ah can provide improved transmission range compared with the conventional 802.11 WLANs operating in the 2.4 GHz and 5 GHz bands. 802.11ah can be used for various purposes including large-scale sensor networks, extended range hotspot, and outdoor Wi-Fi for cellular traffic offloading, whereas the available bandwidth is relatively narrow. IEEE 802.11ax is the successor to 802.11ac; it will increase the efficiency of WLAN networks. IEEE 802.11ax is currently at a very early stage of development and has the goal of providing 4x the throughput of 802.11ac.

Others communication technologies offer lower data throughput while consuming less amounts of spectrum and reduced power consumption such as Bluetooth and Near Field Communication (NFC). Bluetooth is a wireless technology standard for exchanging data over short distances (using short-wavelength UHF radio waves in the ISM band from 2.4 to 2.485 GHz[4]) from fixed and mobile devices, and building personal area networks (PANs). Bluetooth was originally conceived as a wireless alternative to RS-232 data cables and can connect several devices, overcoming problems of synchronization.

Given the current array of available communication technologies, a solution is sought to effectively manage data communication across various communication links.

SUMMARY

Apparatus and methods are provided to effectively manage the communication of data from a first device to a second device using a plurality of communication links which are available between the first device and the second device.

In one novel aspect, a first device discovers a first plurality of communication links from a first device to a second device. The first device includes a first Session Management Module (SSM), and the second device includes a second Session Management Module (SMM). The first devices determines the bandwidth capacity for each of the communication links and selects a second plurality of communication links from the first plurality of communication links. The first device then communicates data from the first device to the second device via the selected second plurality of communication links. Each of the communication links has a different communication characteristic.

In one embodiment, the different communication characteristic is selected from the group consisting of: different frequency band, different communication protocol, and different communication medium.

In another novel aspect, a first device manages a plurality of communication links between a first device and a second device, where each of the communication links have a unique characteristic not shared with any of the other communication links. The first device discovers a service available on the second device via a first communication link and establishes a communication session between the first device and the second device over a first subset of the communication links, where the selection of the first subset of the communication links is a function of a communication link selection rule. The first device exchanges frames over the at least one of the first subset of communication links, where the at least one of the first subset of communication links is selected in accordance with a communication link data selection rule. Then the first device ends the communication session between the first device and the second device when the service is no longer available or needed.

In yet another novel aspect, the first device includes a first physical network port that communicates data to a first communication link, a second physical network port that communicates data to a second communication link, and a session management module that controls the data that is communicated via the first communication link and the data that is communicated via the second communication link. The first devices discovers a second device via a first communication link, establishes a communication session between the communication device and the second device over a first subset of the communication links, where the selection of the first subset of the communication links is a function of a communication link selection rule, exchanges a first type of data over the at least one of the first subset of communication links, wherein the at least one of the first subset of communication links is selected in accordance with a communication link data selection rule, and ends the communication session between the communication device and the second device.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 6 is a table illustrating an exemplary listing of communication link selection rules.

FIG. 7 is a table illustrating an exemplary listing of communication link data selection rules.

DETAILED DESCRIPTION

Reference will now be made in detail to some embodiments of the invention, examples of which are illustrated in the accompanying drawings.

Figure 1:
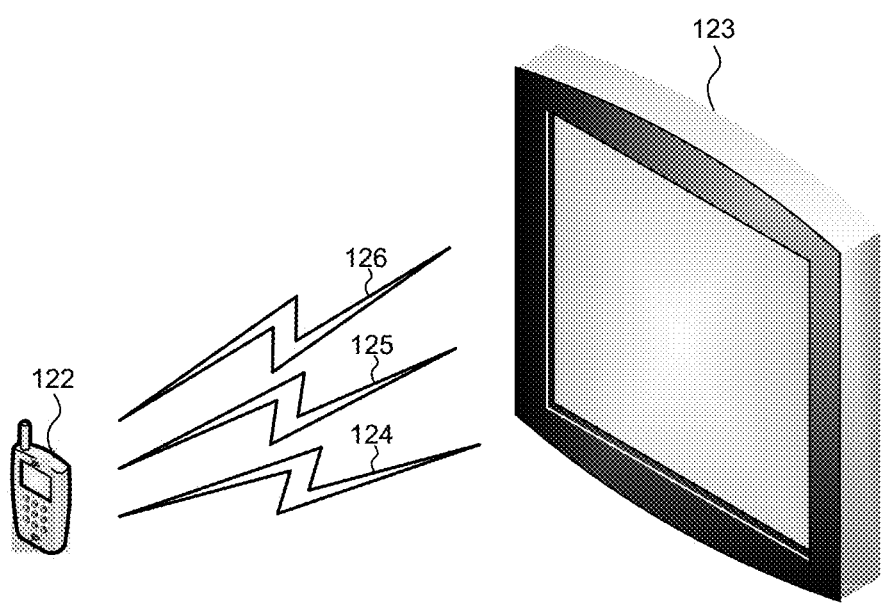
FIG. 1 illustrates multiple communication links between a mobile device and a display device.

FIG. 1 illustrates multiple communication links between a mobile device and a display device. In one example, three different communication links 124-126 are available between the mobile device and the display device. In one instance, these are three different WiFi links such as 802.11a, 802.11ad, and 802.11ah. The data communicated from the mobile device to the display device is multiple frames of video content. Video content may be encoded in a variety of different methods. One popular method is Moving Pictures Expert Group (MPEG) video encoding. MPEG encoding creates different types of frames (I-Frames, P-Frames, and B-Frames) that are communicated to reproduce a video stream. The amount of bandwidth required to communicate each type of frame is different. For example, MPEG communicates much more I-Frame data than B-Frame data.

In currently available devices, all the different types of frames are communicated via one communication link. In these devices, the MPEG encoded video can only be communicated if one of the communication links can provide enough bandwidth to communicate all the frames simultaneously. In the event that no one communication link can handle communication of all the frames simultaneously, the mobile device will not be able to communicate the video to the display device.

In one embodiment of the present invention, the mobile device can communicate a first type of data (I-Frame) via a first communication link 124, a second type of data (P-Frame) via a second communication link 125, and a third type of data (B-Frame) via a third communication link 126. The present embodiment therefore allows the mobile device to communicate the MPEG encoded video in a situation where it previously would not be able to communicate the video to the display device. The display device receives the three different types of data (I-Frame, P-Frame, and B-Frame) via the three different communication links 124-126 simultaneously and combines the different types of data to reproduce the MPEG encoded stream.

In another embodiment of the present invention, the mobile device can communicate different portions of the MPEG encoded video via the different communication links. For example, the mobile device can communicate a first portion of I-Frames via communication link 124, a second portion of I-Frames via communication link 125, and a third portion of I-Frames via communication link 126.

The apparatus and method for utilizing multiple communication links to effectively communicate data is described herein.

Figure 2:
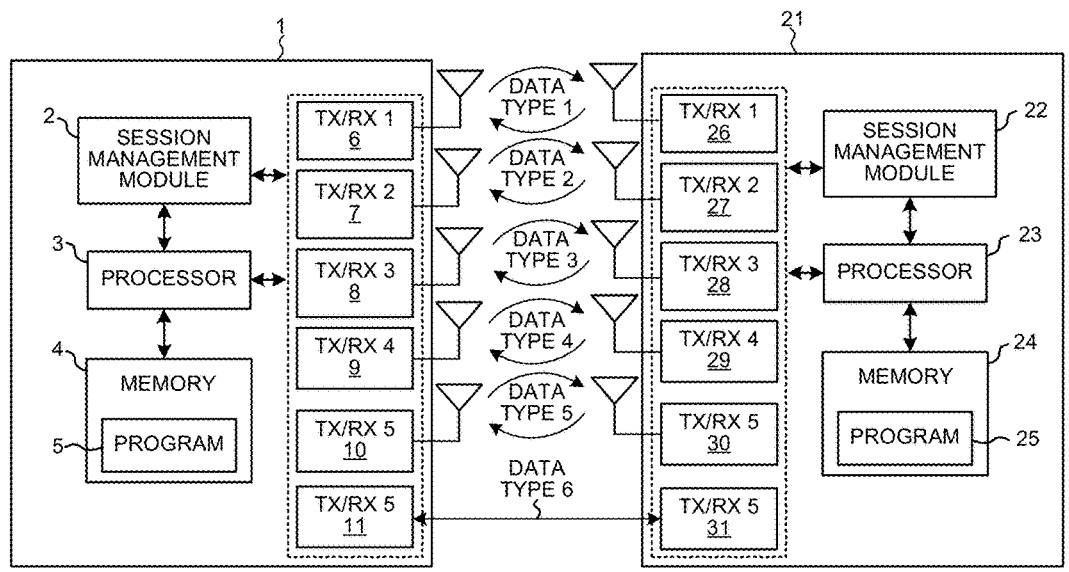
FIG. 2 is a simplified block diagram of a first communication device and a second communication device, where multiple communication links are available between the first and second devices. Each device includes a hardware Session Management Module (SMM) and different types of data are communicated via different communication links.

FIG. 2 is a simplified block diagram of a first communication device 1 and a second communication device 21. The first communication device 1 includes a Session Management Module (SMM) 2, a processor 3, a memory 4 that stores a program (or "application") 5, and a group of transceivers 6-11. As discussed above, transceivers 6-11 can be an combination of available communication technologies (e.g. WiFi, BlueTooth, ZigBee, NFC, S-232, ethernet, optical . . . )

The second communication device 21 includes a Session Management Module (SMM) 22, a processor 23, a memory 24 that stores a program (or "application") 25, and a group of transceivers 26-31. As discussed above, transceivers 26-31 can be an combination of available communication technologies (e.g. WiFi, BlueTooth, ZigBee, NFC, S-232, ethernet, optical . . . )

The SMM can be implement combinatorial logic (referred to herein as a "hardware SMM"). Alternatively, the SMM can be implemented in software (referred to herein as a "software SMM").

The SMM utilizes each transceiver included in the first communication device to discover what communication links are available between the first communication device and the second communication device. It is noted herein that the communication links can be separated by any characteristics, such as, different frequency band, different channel, different communication mode, different communication protocol, and different communication medium.

Once the SMM has discovered all the available communication links between the first communication device and the second communication device, the SMM utilizes the transceivers to determine the amount of bandwidth that is available on each of the available communication links. In the event that a corresponding transceiver on the second communication link is not enabled, the SMM utilizes an enabled communication link to communicate an enable signal to the second communication device so to cause the second communication device to enable the disable transceiver.

Based on the communication link selection rule (e.g. amount of bandwidth that is available on each of the communication links) the SMM selects a subgroup of communication links. The communication link selection rule is described in greater detail below regarding FIG. 6. Three communication links are selected: a first communication link from transceiver 6 to transceiver 26, a second communication link from transceiver 7 to transceiver 27, and a third communication link from transceiver 8 to transceiver 28. The first communication link has the largest available bandwidth and the third communication link has the lowest available bandwidth.

The SMM optionally determines the type of encoding to be performed on the data before transmission. Referring back to FIG. 1, in the event of communicating a video stream the SMM may determine that encoding the video stream in MPEG format would result in a data bandwidth that can be satisfied the by available bandwidth across the selected communication links.

The SMM then decides how the MPEG encoded video is to be communicated across the selected communication links according to a communication link data selection rule. The communication link data selection rule is described in greater detail below regarding FIG. 7. In one example the SMM assigns the I-Frames of the MPEG stream as data type 1 that is communicated across a first communication link from transceiver 6 to transceiver 26 (because the majority of MPEG data is I-Frame data and the first communication link has at least 1 MBPS bandwidth available), assigns the P-Frames of the MPEG stream as data type 2 that is communicated across a second communication link from transceiver 7 to transceiver 27 (because the second communication link has at least 0.5 MBPS available bandwidth), and assigns the B-Frames of the MPEG stream as data type 3 that is communicated across a third communication link from transceiver 8 to transceiver 28 (because the minority of the MPEG stream is B-Frame data and the third communication link has at least 0.1 MBPS available bandwidth). Once the entire MPEG stream has been communicated the SMM ends the communication session and frees the first, second, and third communication links for use by other applications.

Therefore, FIG. 2 illustrates a method and apparatus for separating data based on data type and communicating each separate data type via a different communication link.

The combination of communication links described above regarding FIG. 2 is only exemplary. In operation the SMM can select any combination of available communication links to communicate data as effectively as possible.

Figure 3:
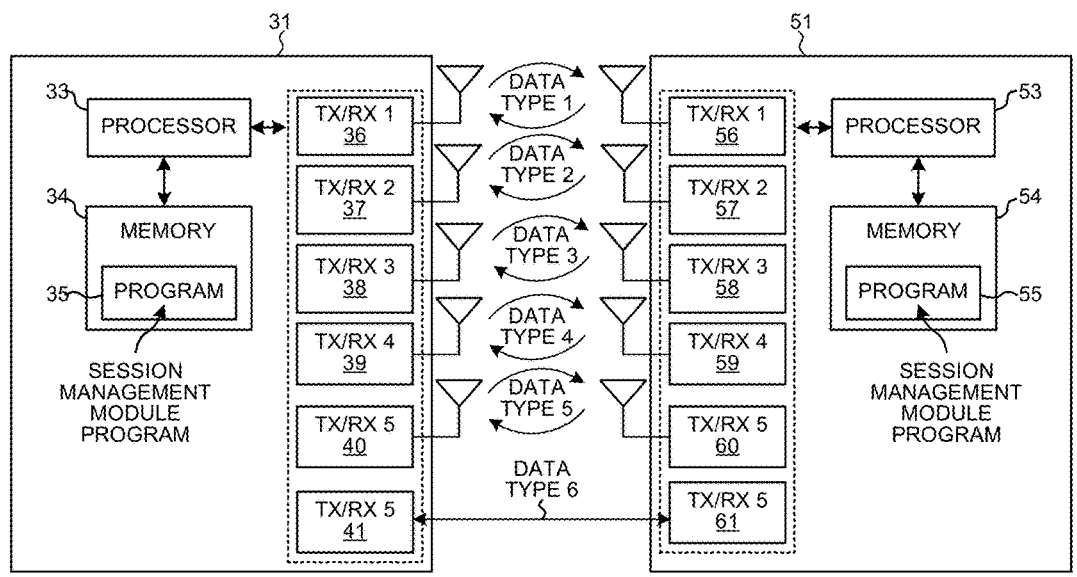
FIG. 3 is a simplified block diagram of a first communication device and a second communication device, where multiple communication links are available between the first and second devices. Each device includes a software Session Management Module (SMM) and different portions of a type of data are communicated via different communication links.

FIG. 3 is a simplified block diagram of a first communication device 31 and a second communication device 51, where multiple communication links are available between the first and second devices. The contents and operation of communication devices 31 and 51 are similar to the content and operation of communication devices 1 and 21 in FIG. 1; however, the communication devices 31 and 51 do not include a hardware SMM, but rather include a SMM program that is stored in memory and executed by the processor. In operation, the communication device boots up and loads the SMM program (or "application"). The SMM program then communicates with each of the transceiver devices to perform the functions listed above regarding FIG. 2.

Figure 4:
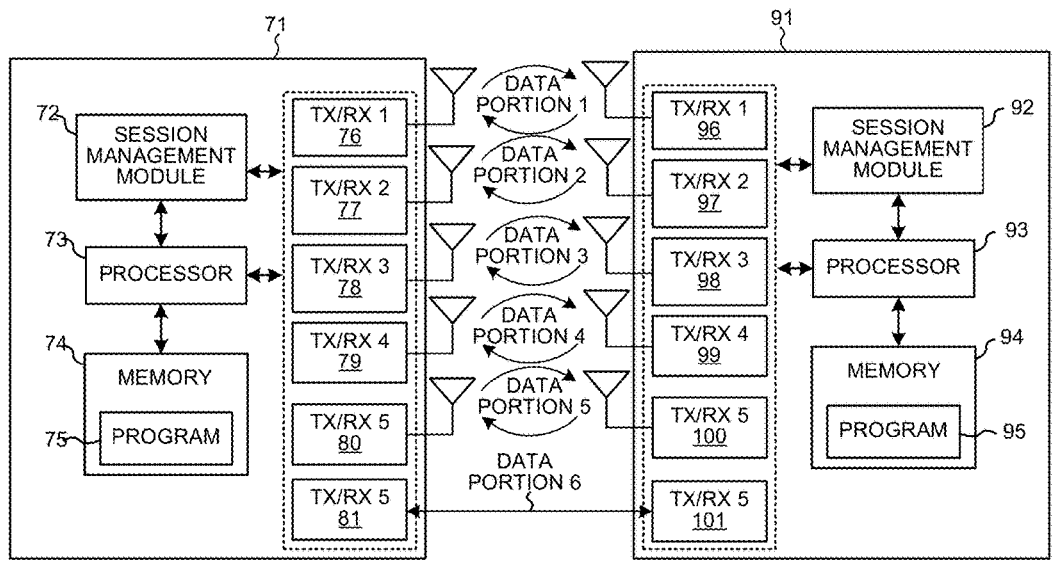
FIG. 4 is a simplified block diagram of a first communication device and a second communication device, where multiple communication links are available between the first and second devices. Each device includes a hardware Session Management Module (SMM) and different types of data are sent via different communication links.

FIG. 4 is a simplified block diagram of a first communication device 71 and a second communication device 91. The first communication device 71 includes a Session Management Module (SMM) 72, a processor 73, a memory 74 that stores a program (or "application") 75, and a group of transceivers 76-81. As discussed above, transceivers 76-81 can be an combination of available communication technologies (e.g. WiFi, BlueTooth, ZigBee, NFC, S-232, ethernet, optical . . . )

The second communication device 91 includes a Session Management Module (SMM) 92, a processor 93, a memory 94 that stores a program (or "application") 95, and a group of transceivers 96-101. As discussed above, transceivers 96-101 can be an combination of available communication technologies (e.g. WiFi, BlueTooth, ZigBee, NFC, S-232, ethernet, optical . . . )

The SMM can be implement combinatorial logic (referred to herein as a "hardware SMM"). Alternatively, the SMM can be implemented in software (referred to herein as a "software SMM").

The SMM utilizes each transceiver included in the first communication device to discover what communication links are available between the first communication device and the second communication device. It is noted herein that the communication links can be separated by any characteristics, such as, different frequency band, different channel, different communication mode, different communication protocol, and different communication medium.

Once the SMM has discovered all the available communication links between the first communication device and the second communication device, the SMM utilizes the transceivers to determine the amount of bandwidth that is available on each of the available communication links. In the event that a corresponding transceiver on the second communication link is not enabled, the SMM utilizes an enabled communication link to communicate an enable signal to the second communication device so to cause the second communication device to enable the disable transceiver.

Based on the communication link selection rule (e.g. the total amount of bandwidth that is available via the select communication link). Based on the communication link selection rule, the SMM selects a subgroup of communication links. Three communication links are selected: a first communication link from transceiver 76 to transceiver 96, a second communication link from transceiver 77 to transceiver 97, and a third communication link from transceiver 78 to transceiver 98. The first communication link has the largest available bandwidth and the third communication link has the lowest available bandwidth. The SMM optionally determines the type of encoding to be performed on the data before transmission.

Referring back to FIG. 1, in the event of communicating a video stream the SMM may determine that encoding the video stream in MPEG format would result in a data bandwidth that can be satisfied the by available bandwidth across the selected communication links. The SMM then decides how the MPEG encoded video is to be communicated across the selected communication links.

In one example, the SMM select different portions of one type of data to be communicated via different communication links. For example, the SMM can select a first portion of I-Frames to communicated via the first communication link, select a second portion of I-Frames to be communicated via the second communication link, and select a third portion of the I-Frames to be communicated via the third communication link. Therefore, allowing communication of all the I-Frame data in less time.

Therefore, FIG. 4 illustrates a method and apparatus of separating data not by type, but by different portions of one type of data and communicating each portion across a different communication link.

Figure 5:
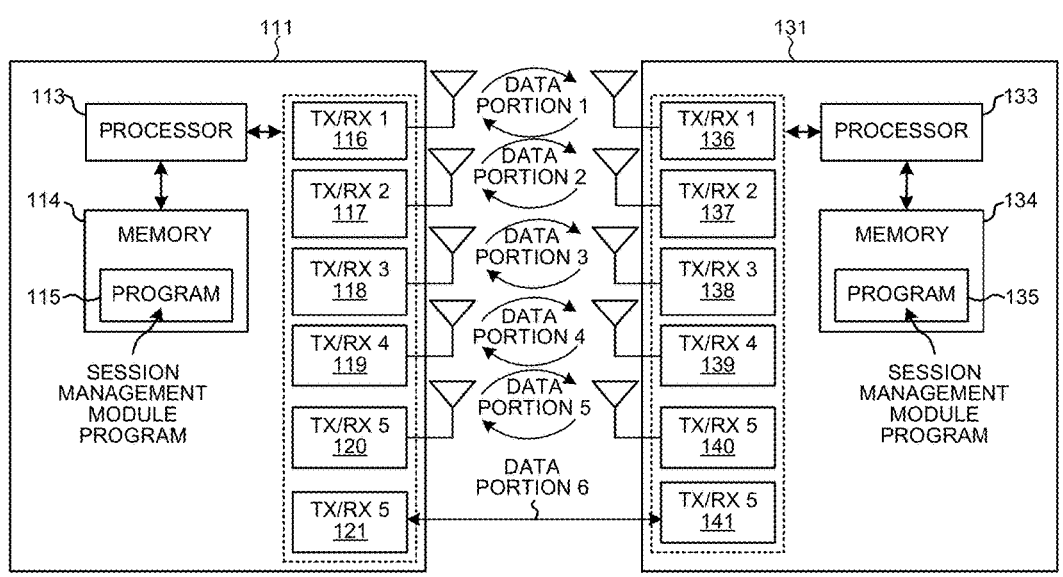
FIG. 5 is a simplified block diagram of a first communication device and a second communication device, where multiple communication links are available between the first and second devices. Each device includes a software Session Management Module (SMM) and different portions of a type of data are communicated via different communication links.

FIG. 5 is a simplified block diagram of a first communication device 111 and a second communication device 131, where multiple communication links are available between the first and second devices. The contents and operation of communication devices 111 and 131 are similar to the content and operation of communication devices 71 and 91 in FIG. 3; however, the communication devices 111 and 131 do not include a hardware SMM, but rather include a SMM program that is stored in memory and executed by the processor. In operation, the communication device boots up and loads the SMM program (or "application"). The SMM program then communicates with each of the transceiver devices to perform the functions listed above regarding FIG. 4.

FIG. 6 is a table illustrating an exemplary listing of communication link selection rules. The table includes the following requirements: a minimum bandwidth of 1 MBPS, a minimum Signal-to-Noise ratio of 10, a maximum latency of 1 millisecond, and a series of preferred communication technologies. In one example, the rules and preferences are hard coded. In another example, the rules and the preferences are set by the application communicating the data. In a third example, the rules are hard coded but the preferences are selected by the application communicating the data. Allowing the application to set the rules and preferences provides greater flexibility for application operation. Hard coding the rules and the preferences guards against misbehaving applications. Hard coding the rules and allowing the application to set the preferences provides some application control within limits.

FIG. 7 is a table illustrating an exemplary listing of communication link data selection rules. Similar to the table illustrated in FIG. 6, the communication link data selection rule table includes rules and preferences. The rules list out what communication link characteristics are required for a given type of data. Referring back to the example of FIG. 1, when communicating MPEG video communicating different types of MPEG frames requires different amounts of bandwidth. Therefore, the rules listed in FIG. 7 can be used for MPEG video communication. Once the set of communication links has be selected using the communication link selection rule, the type of data communicated on each of the selected communication links can be determined using the communication link data selection rule.

In one example, the rules and preferences are hard coded. In another example, the rules and the preferences are set by the application communicating the data. In a third example, the rules are hard coded but the preferences are selected by the application communicating the data. Allowing the application to set the rules and preferences provides greater flexibility for application operation. Hard coding the rules and the preferences guards against misbehaving applications. Hard coding the rules and allowing the application to set the preferences provides some application control within limits.

Figure 8:
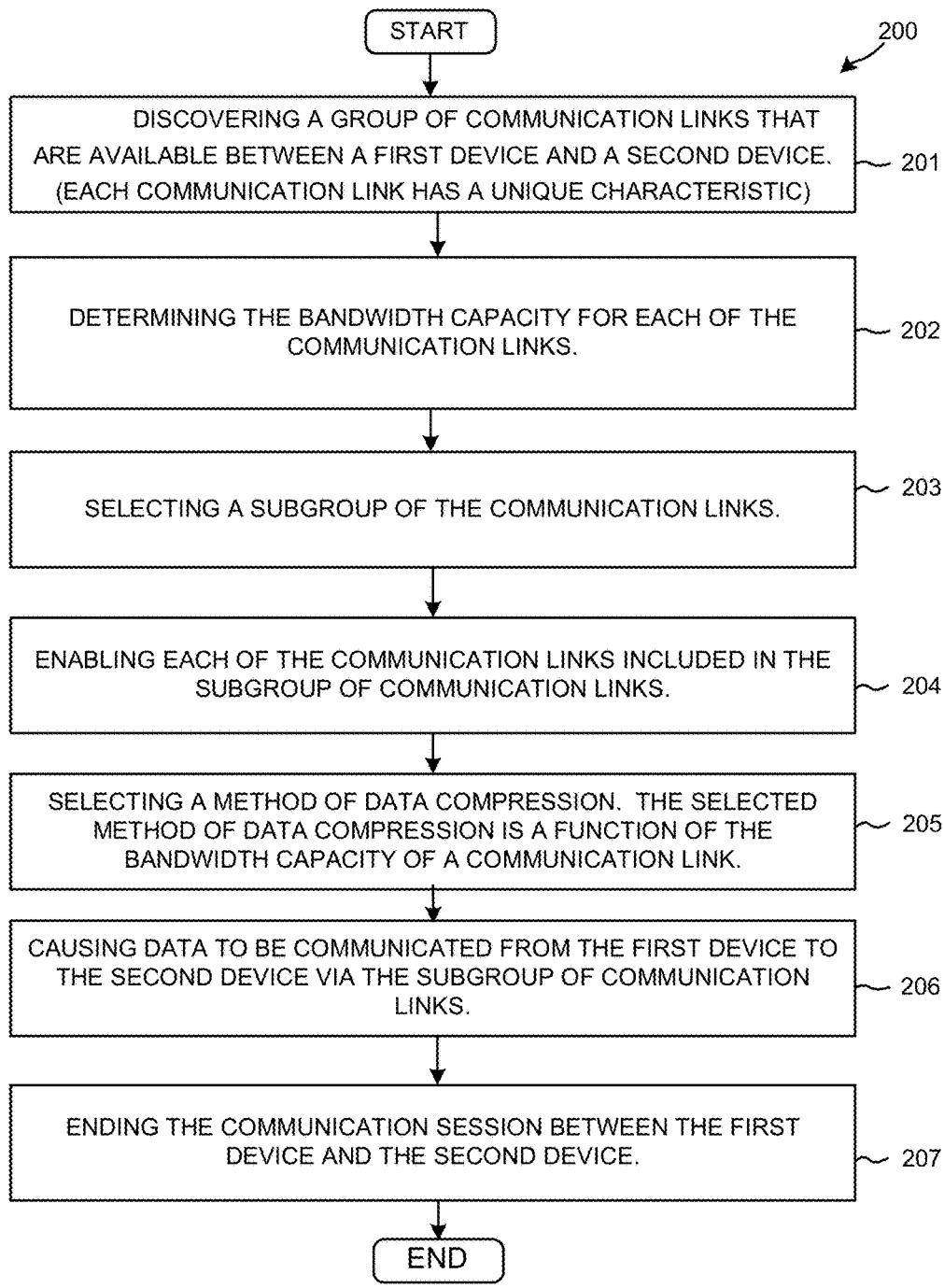
FIG. 8 is a flowchart illustrating a first set of exemplary steps performed by the Session Management Module (SMM).

FIG. 8 is a flowchart 200 illustrating a first set of exemplary steps performed by the Session Management Module (SMM). In step 201, a group of communication links that are available between a first device and a second device are discovered. (Each communication link has a unique characteristic). In step 202, the bandwidth capacity for each of the communication links is determined. In step 203, a subgroup of the communication links are selected. In step 204, each of the communication links included in the subgroup are enabled. In step 205, a method of data compression is selected (optional). In step 206, data is communicated from the first device to the second device via the selected subgroup of communication links. In step 207, the communication session between the first device and the second device is ended.

Figure 9:
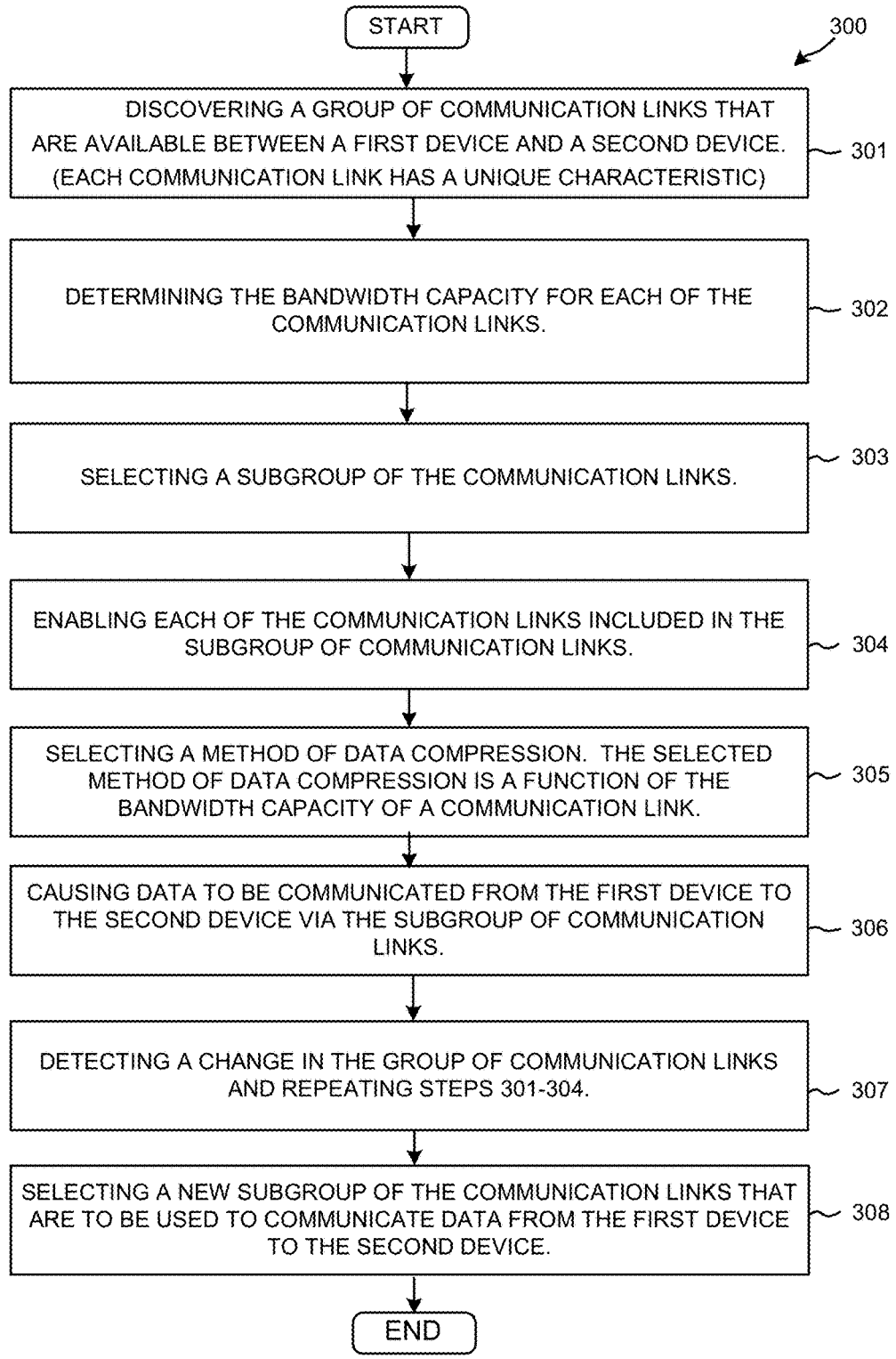
FIG. 9 is a flowchart illustrating a second set of exemplary steps performed by the Session Management Module (SMM).

FIG. 9 is a flowchart 300 illustrating a second set of exemplary steps performed by the Session Management Module (SMM). In step 201, a group of communication links that are available between a first device and a second device are discovered. (Each communication link has a unique characteristic). In step 302, the bandwidth capacity for each of the communication links is determined. In step 303, a subgroup of the communication links are selected. In step 304, each of the communication links included in the subgroup are enabled. In step 305, a method of data compression is selected (optional). In step 306, data is communicated from the first device to the second device via the selected subgroup of communication links. In step 307, a change in the group of communication links is detected and steps 301-304 are repeated. In step 308, a new subgroup of communication links are selected and used to communicate data from the first device to the second device. Over time the availability and characteristics of various communication links may change. Therefore, the selected and available communication links must be monitored and updated as needed.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   (a) discovering a first plurality of wireless communication links from a first device to a second device, wherein the first device comprises a first Session Management Module (SSM), and wherein the second device comprises a second Session Management Module (SMM);
   (b) determining the bandwidth capacity for each of the first plurality of wireless communication links;
   (c) selecting a second plurality of wireless communication links, wherein each of the second plurality of wireless communication links are included in the first plurality of wireless communication links, and wherein the selecting of (c) is a function of a preference indicator generated by a processor executing an application included in the first device;
   (d) selecting a method of data compression, wherein the selected method of data compression is a function of the bandwidth capacity determined in (b); and
   (e) communicating a single stream of data from the first device to the second device via the selected second plurality of wireless communication links, wherein each of the wireless communication links have a different communication characteristic, wherein a first portion of the data is communicated via a first wireless communication link of the second plurality of wireless communication links, and wherein a second portion of the data is communicated via a second wireless communication link of the second plurality of wireless communication links.

2. The method of claim 1, wherein the different communication characteristic is selected from the group consisting of: different frequency band, different communication protocol, and different communication medium.

3. The method of claim 1, wherein the determining of (a) and the selecting of (c) is performed by the first SMM on the first device, and wherein the first SMM is a combinatory logic circuit.

4. The method of claim 1, wherein the determining of (a) and the selecting of (c) is performed by the first SMM, and wherein the first SMM is an application executing on a processor.

5. The method of claim 1, further comprising:
(c1) enabling the selected second plurality of wireless communication links on the second device, wherein the enabling of (c1) is performed by the second SMM in response to receiving a configuration command from the first SMM.

6. The method of claim 1, wherein the data is video data, wherein the first portion of the data is I-frame data, and wherein the second portion of the data is P-frame data.

7. The method of claim 1, further comprising:
(f) detecting a change in the first plurality of wireless communication links;
(g) determining the bandwidth capacity for each of the first plurality of wireless communication links;
(h) selecting a third plurality of wireless communication links; and
(I) communicating data from the first device to the second device via the third plurality of wireless communication links, wherein the third plurality of wireless communication links are included in the first plurality of wireless communication links.

8. The method of claim 1, further comprising:
(f) detecting a new wireless communication link that is not included in the first plurality of wireless communication links;
(g) adding the new wireless communication link to the selected second plurality of wireless communication links, thereby generating a third plurality of wireless communication links; and
(h) communicating data from the first device to the second device via the third plurality of wireless communication links.

9. A method for managing a plurality of communication links between a first device and a second device, wherein each of the communication links have a unique characteristic not shared with any of the other communication links, the method comprising:
(a) discovering a service available on the second device via a first communication link;
(b) establishing a communication session between the first device and the second device over a first subset of the communication links, wherein the selection of the first subset of the communication links is a function of a communication link selection rule;
(c) communicating a first portion of a stream of data via a first communication link and a second portion of the stream of data via a second communication link, wherein the at least one of the first subset of communication links is selected in accordance with a communication link data selection rule; and wherein the communication link selection rule is a function of a preference generated by a processor executing an application included in the first device; and
(d) ending the communication session between the first device and the second device when the service is no longer available or needed.

10. The method of claim 9, wherein the communication link selection data rule limits the bandwidth that can be used for each communication link.

11. The method of claim 9, wherein the communication link selection rule requires that a communication link have a minimum signal-to-noise ratio.

12. The method of claim 9, wherein communication link selection rule is a policy set by a network controller.

13. The method of claim 9, wherein the communication link data selection rule limits communication of a first type of data to one of the plurality of communication links.

14. The method of claim 9, wherein the communication link data selection rule is a pattern of traffic.

15. The method of claim 9, wherein the communication link data selection rule is a transmitter policy.

16. A communication device, comprising:
a first physical network port that communicates data to a first wireless communication link;
a second physical network port that communicates data to a second wireless communication link; and
a Session Management Module (SMM) that controls the data that is communicated via the first wireless communication link and the data that is communicated via the second wireless communication link, wherein the SMM causes the following steps to be performed:
(a) discovering a second device via a first communication link;
(b) establishing a communication session between the communication device and the second device over a first subset of the wireless communication links, wherein the selection of the first subset of the wireless communication links is a function of a communication link selection rule;
(c) communicating a first portion of a stream of data via a first wireless communication link and a second portion of the stream of data via a second wireless communication link, wherein the at least one of the first subset of wireless communication links is selected in accordance with a communication link data selection rule; and wherein the communication link selection rule and the communication link data selection rule are both set by a processor executing an application included in the communication device; and
(d) ending the communication session between the communication device and the second device.

* * * * *